United States Patent
Ravichandran et al.

(10) Patent No.: US 10,419,146 B2
(45) Date of Patent: Sep. 17, 2019

(54) METHOD AND DEVICE FOR DETECTING A TRANSMISSION FROM AN INTERFERING RADIO CELL

(71) Applicant: Intel IP Corporation, Santa Clara, CA (US)

(72) Inventors: Manoj Ravichandran, Munich (DE); Andrey Chervyakov, Nizhny Novgorod (RU); Franz Eder, Neubiberg (DE); Stefan Fechtel, Zorneding (DE); Sabine Roessel, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/738,599

(22) PCT Filed: May 24, 2016

(86) PCT No.: PCT/EP2016/061678
§ 371 (c)(1),
(2) Date: Dec. 21, 2017

(87) PCT Pub. No.: WO2016/206898
PCT Pub. Date: Dec. 29, 2016

(65) Prior Publication Data
US 2018/0175959 A1 Jun. 21, 2018

(30) Foreign Application Priority Data
Jun. 26, 2015 (DE) .................. 10 2015 110 338

(51) Int. Cl.
*H04W 16/14* (2009.01)
*H04J 11/00* (2006.01)
*H04W 48/16* (2009.01)

(52) U.S. Cl.
CPC ......... *H04J 11/005* (2013.01); *H04J 11/0079* (2013.01); *H04W 48/16* (2013.01)

(58) Field of Classification Search
CPC ...... H04J 11/005; H04W 16/14; H04W 24/02
See application file for complete search history.

(56) References Cited

U.S. PATENT DOCUMENTS

2013/0202063 A1 8/2013 Reial et al.
2014/0233466 A1 8/2014 Pourahmadi et al.
(Continued)

FOREIGN PATENT DOCUMENTS

EP 2887750 A1 6/2015
WO 2014204171 A1 12/2014

OTHER PUBLICATIONS

International Search Report based on Application No. PCT/EP2016/061678 (3 Pages) dated Sep. 5, 2016 (Reference Purpose Only).
(Continued)

*Primary Examiner* — Myron Wyche
(74) *Attorney, Agent, or Firm* — Viering, Jentschura & Partner MBB

(57) ABSTRACT

A method for detecting a transmission from an interfering radio cell includes: receiving a signal comprising transmissions from a serving radio cell and from a plurality of interfering radio cells, wherein a reference symbol of a transmission from at least one interfering radio cell of the plurality of interfering radio cells is colliding with a reference symbol of a transmission from the serving radio cell; generating a set of transmission signal hypotheses, each of which is dependent on at least one interferer parameter of the at least one interfering radio cell; obtaining at least one interferer radio cell identifier; and detecting a transmission from at least one interfering radio cell of the plurality of interfering radio cells in the received signal based on the at
(Continued)

least one interferer radio cell identifier and the set of transmission signal hypotheses.

26 Claims, 8 Drawing Sheets

(56) References Cited

U.S. PATENT DOCUMENTS

2014/0362769 A1* 12/2014 Chen .................... H04J 11/0036
                                                    370/328
2014/0369293 A1   12/2014 Guo et al.
2015/0078190 A1*  3/2015 Cheng ................... H04W 24/02
                                                    370/252
2016/0119936 A1*  4/2016 Kim ..................... H04J 11/0053
                                                    370/329

OTHER PUBLICATIONS

German Office Action based on Application No. 102015110338.9 (6 Pages) dated Nov. 12, 2015 (Reference Purpose Only).

\* cited by examiner

Fig. 8

METHOD AND DEVICE FOR DETECTING A TRANSMISSION FROM AN INTERFERING RADIO CELL

RELATED APPLICATIONS

The present application is a national stage entry according to 35 U.S.C. § 371 of PCT application No.: PCT/EP2016/061678 filed on May 24, 2016, which claims priority from German application No.: 10 2015 110 338.9 filed on Jun. 26, 2015, and is incorporated herein by reference in its entirety.

FIELD

The disclosure relates to a method and a device for detecting a transmission from an interfering radio cell. In particular, the disclosure relates to techniques for interference signal presence detection for enhanced IS/IC (interference suppression/interference cancellation receivers.

BACKGROUND

In a radio communication system 100, e.g. as illustrated in FIG. 1 downlink transmission from a serving radio cell 110 to a mobile station 120 (also referred to as user equipment (UE), mobile terminal or mobile phone) may be distorted by interfering signals of multiple interfering radio cells 111, 112.

In modern communication standards such as 3GPP LTE Rel. 12 enhanced IS/IC receivers are introduced. The respective enhanced IS/IC receivers are designed in away to improve the downlink (DL) throughput performance via suppression and/or cancellation of the interference signals coming from the neighboring cells 111, 112 transmissions. To enable operation of the enhanced IS/IC receivers UE 120 needs to make channel estimation of the interferer signals and obtain knowledge of the interference cells 111, 112 signals transmission parameters in addition to the parameters of the serving cell 110. The respective parameters may include interferer signal presence, modulation format, precoding structure, power level, etc. The majority of these parameters need to be detected at the UE side.

There is a need to improve detection of interference scenarios in the mobile device in order to improve data throughput.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

FIG. 8 illustrates a schematic diagram 800 illustrating the operation of the algorithm 700 depicted in FIG. 7.

DETAILED DESCRIPTION

Figure 1:
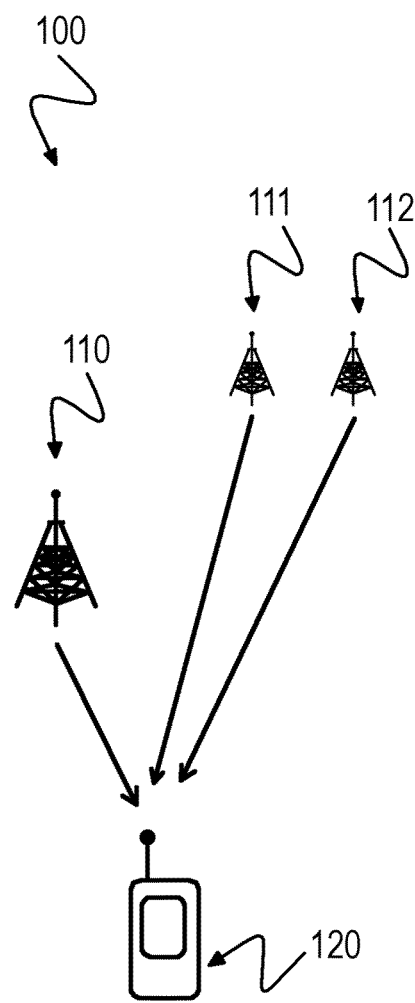
FIG. 1 is a schematic diagram illustrating a conventional radio communication system 100.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
CRS: Cell specific Reference Signal,
RE: Resource Element,
RS: Reference Signal,
DMRS: Demodulation Reference Signal,
RB: Resource Block,
PRB: Physical Resource Block,
3GPP: 3rd Generation Partnership Project,
LTE: Long Term Evolution,
LTE-A: LTE Advanced, Release 10 and higher versions of 3GPP LTE,
RF: Radio Frequency,
UE: User Equipment,
SNR: signal-to-noise ratio,
INR: interference-to-noise ratio,
OFDM: Orthogonal Frequency Division Multiplex,
eNodeB: base station,
IC: Interference Cancellation,
IS: Interference Suppression,
(e)ICIC: (enhanced) Inter-Cell Interference Coordination,
MIMO: Multiple Input Multiple Output,
CE: Channel Estimation,
HARQ: Hybrid Automatic Repeat Request,
DL: Downlink,
AP: antenna port,
MD: misdetection,
FA: false alarm,
SCID: scrambling ID,
LMMSE: linear minimum mean square error.

The methods and devices described herein may be based on IS/IC receivers and IS/IC receiver circuits in mobile devices, in particular LTE radio receivers. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM. The methods and devices described below may be implemented in mobile devices (or mobile stations or User Equipments (UE)), in particular in radio receivers of such mobile devices. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G LTE, is a standard for wireless communication of high-speed data for mobile phones and data terminals.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in multi-layer heterogeneous networks. Multi-layer heterogeneous networks (HetNet) may be used in LTE and LTE-Advanced standards to build up the network of not only a single type of eNodeB (homogeneous network), but to deploy eNodeBs with different capabilities, most importantly different Tx-power classes.

The methods and devices described hereinafter may be applied in eICIC systems. The methods and devices described hereinafter may be applied in Carrier Aggregation systems. Carrier Aggregation may enable an LTE-A UE to connect to several carriers simultaneously. It not only may allow resource allocation across carriers, it also may allow scheduler based fast switching between carriers without time consuming handover.

The methods and devices described hereinafter may be applied in MIMO systems and diversity receivers. Multiple-input multiple-output (MIMO) wireless communication systems employ multiple antennas at the transmitter and/or at the receiver to increase system capacity and to achieve better quality of service. In spatial multiplexing mode, MIMO systems may reach higher peak data rates without increasing the bandwidth of the system by transmitting multiple data streams in parallel in the same frequency resources. A diversity receiver uses two or more antennas to improve the quality and reliability of a wireless link.

The methods and devices described hereinafter may be applied in network assisted interference cancellation and suppression (NAICS) systems, for example NAICS according to TS 36.866 3GPP specification for LTE Releases 12 and higher. Network assisted interference cancellation and suppression (NAICS) is being studied for 3GPP LTE-A to mitigate interference in multi-cell networks. To accomplish this goal, various interference mitigation techniques have been proposed.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

Figure 2:
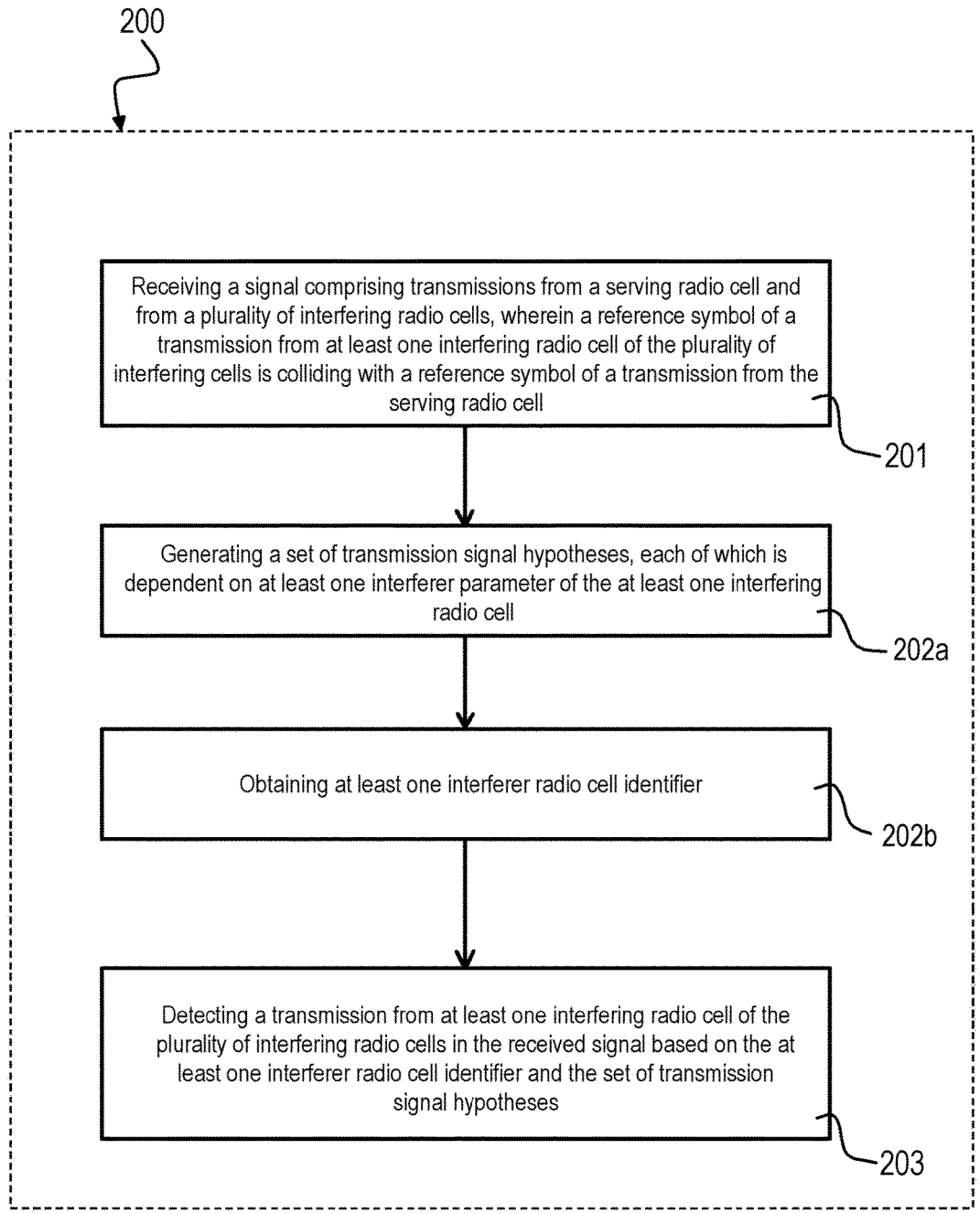
FIG. 2 schematically illustrates an exemplary method 200 for detecting a transmission from an interfering radio cell.

FIG. 2 schematically illustrates an exemplary method 200 for detecting a transmission from an interfering radio cell.

The method 200 includes receiving 201 a signal comprising transmissions from a serving radio cell and from a plurality of interfering radio cells, wherein a reference symbol of a transmission from at least one interfering radio cell of the plurality of interfering radio cells is colliding with a reference symbol of a transmission from the serving radio cell. The method 200 includes generating 202a a set of transmission signal hypotheses, each of which is dependent on at least one interferer parameter of the at least one interfering radio cell. The method 200 includes obtaining 202b at least one interferer radio cell identifier. The method 200 includes detecting (203) a transmission from at least one interfering radio cell of the plurality of interfering radio cells in the received signal based on the at least one interferer radio cell identifier and the set of transmission signal hypotheses.

The method may include providing the at least one cell identifier by using higher layer signaling.

The method may include providing the at least one cell identifier autonomously via cell search procedures.

The received signal may include a reference symbol of the at least one interfering radio cell which is colliding with a reference symbol of the serving cell.

The method 200 may further include determining a channel estimate of the at least one interfering radio cell for each hypothesis of the set of hypotheses based on a respective combination of the interferer parameters of the first interfering radio cell.

The at least one interference parameter may include an interference signal scrambling identity, in particular a DMRS scrambling identity $n_{SCID}$ and the second interference parameter may include an interference signal antenna port, in particular a DMRS antenna port, e.g. according to LTE TS 36.211, used for transmission.

The method 200 may further include detecting the transmission from the at least one interfering radio cell based on the measurement of the interference signal receive power, in particular the interference reference signals receive power.

The method 200 may further include reconstructing the received signal from the at least one interfering radio cell based on the channel estimate of the at least one interfering radio cell determined based on the set of hypotheses; and cancelling the reconstructed received signal from the at least one interfering radio cell from the received signal.

The reconstructed receive signal from the at least one interfering radio cell may be cancelled from the total received signal if the estimate of the at least one interfering radio cell signal receive power of the determined based on the set of hypotheses crosses a threshold.

The detection 203 of a transmission from the first interfering radio cell in the received signal based on the first cell identifier and based on the set of hypotheses may be iteratively repeated until a transmission is successfully detected.

The successful detection of a transmission may be based on a threshold crossing.

The method may include: creating a list of interference signal hypotheses; channel estimation of the interference signal at reference symbol REs for all interference signal hypotheses; and interference signal presence detection. The blocks of creating the list, channel estimation and interference signal presence detection may be repeated to improve detection reliability.

Figure 3:
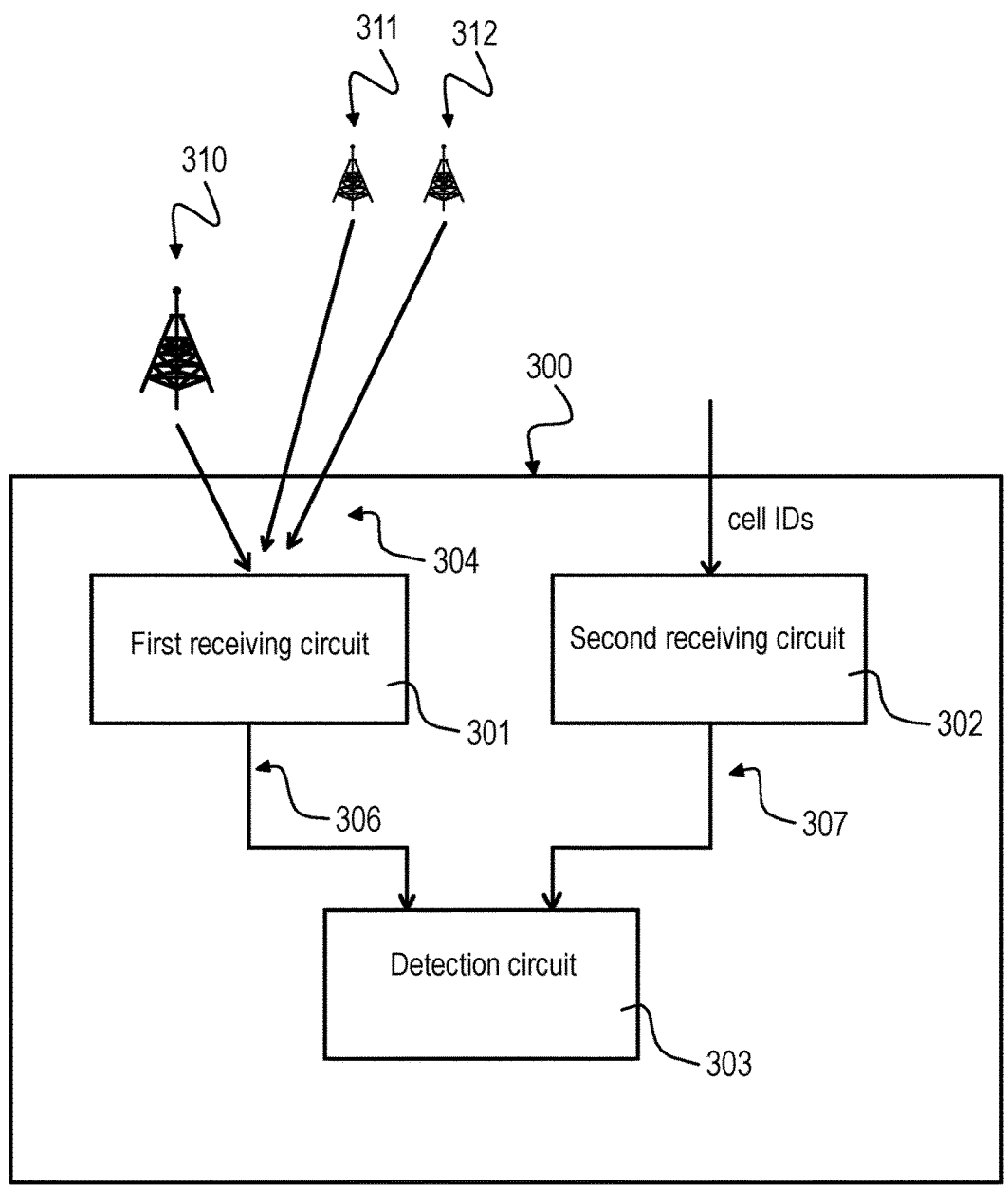
FIG. 3 schematically illustrates a block diagram of a device 300 for detecting a transmission from an interfering radio cell.

FIG. 3 schematically illustrates a block diagram of a device 400 for detecting a transmission from an interfering radio cell. The device 300 includes a first receiving circuit 301, a second receiving circuit 302 and a detection circuit 303.

The first receiving circuit 301 is used for receiving a signal 306 comprising transmissions 304 from a serving radio cell 310 and from a plurality of interfering radio cells 311, 312.

A demodulation reference symbol of a transmission from at least one interfering radio cell (e.g. the cell 311) of the plurality of interfering radio cells 311, 312 is colliding with a demodulation reference symbol of a transmission from the serving radio cell 310.

The second receiving circuit 302 is used for receiving a set of cell identifiers 307. Each cell identifier of the set 307 is assigned to a corresponding interfering radio cell of the plurality of interfering radio cells 311, 312.

The detection circuit 303 is used for detecting a transmission from a first interfering radio cell (e.g. the cell 311) of the plurality of interfering radio cells 311, 312 in the received signal 306 based on a first cell identifier of the set of cell identifiers 307 and based on a set of hypotheses.

Each hypothesis of the set is indicating a respective combination of a demodulation reference symbol scrambling identity and a demodulation reference symbol antenna port of the first interfering radio cell 311.

The device 300 may include a processing circuit for determining for each hypothesis of the set of hypotheses a channel estimate of the first interfering radio cell 311 based on the respective combination of the scrambling identifier and the demodulation reference symbol antenna port of the first interfering radio cell 311.

The processing circuit may detect for each hypothesis of the set of hypotheses the transmission from the first interfering radio cell 311 based on a estimate of the first interfering radio cell signal receive power 311 determined based on the respective hypothesis.

The processing circuit may eliminate the hypotheses for which the estimate of the first interfering radio cell 311 signal receive power determined based on the respective hypothesis is below a threshold.

The processing circuit may reconstruct the received signal from the first interfering radio cell 311 based on the channel of the first interfering radio cell 311 determined based on the respective hypothesis.

The processing circuit may cancel the reconstructed received signal from the first interfering radio cell 311 from the received signal 306.

The detection circuit 303 may detect a transmission from a second interfering radio cell (e.g. the cell 312) of the plurality of interfering radio cells 311, 312 in the received signal 306 based on a second cell identifier of the set of cell identifiers 307 and based on a set of hypotheses, each hypothesis of the set indicating a respective combination of a scrambling identifier and a demodulation reference symbol antenna port of the second interfering radio cell 312.

The processing circuit may cancel the reconstructed received signal from the second interfering radio cell 312 from the received signal 306 cancelled by the reconstructed received signal from the first interfering radio cell 311.

Figure 4:
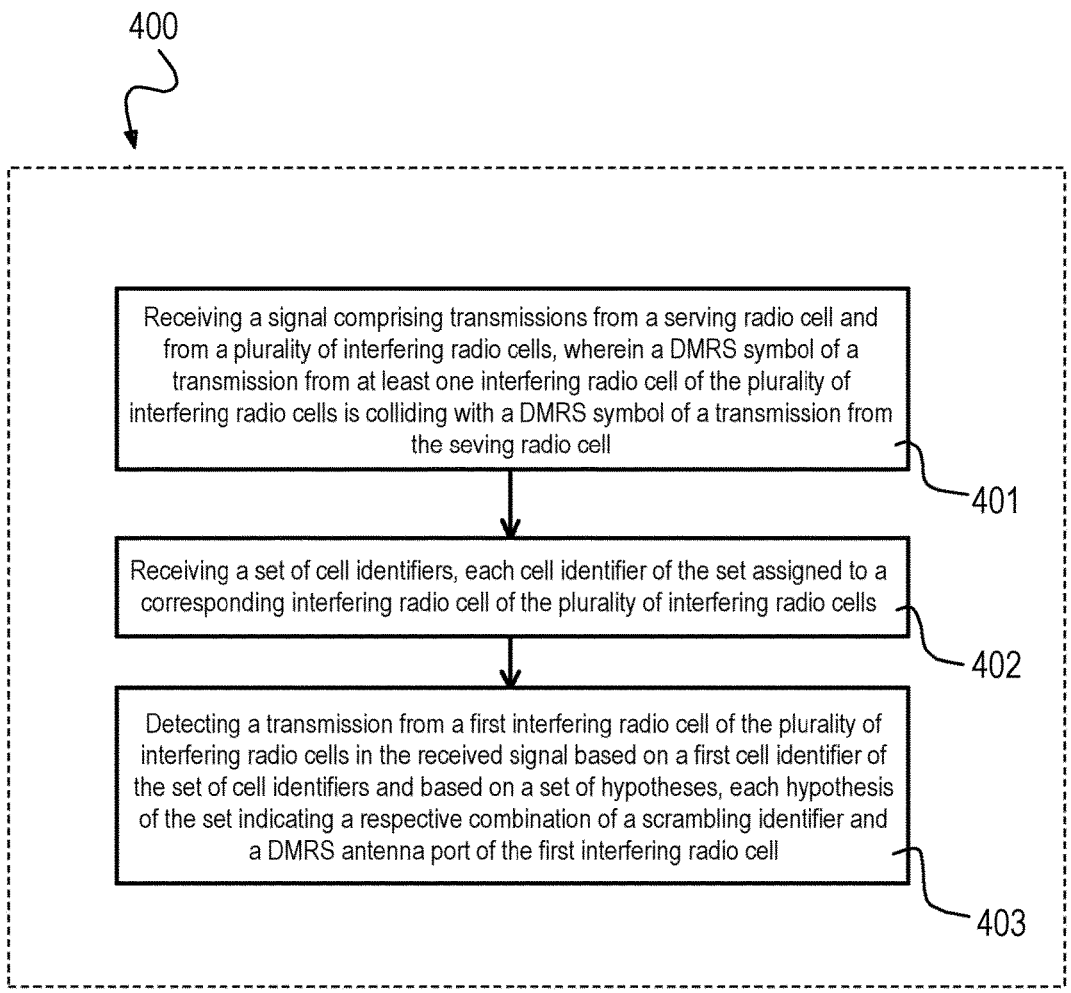
FIG. 4 schematically illustrates an exemplary method 400 method for detecting a transmission from an interfering radio cell.

FIG. 4 schematically illustrates an exemplary method 400 method for detecting a transmission from an interfering radio cell.

The method 400 includes receiving 401 a signal comprising transmissions from a serving radio cell and from a plurality of interfering radio cells, wherein a DMRS symbol of a transmission from at least one interfering radio cell of the plurality of interfering radio cells is colliding with a DMRS symbol of a transmission from the serving radio cell. The method 400 includes receiving 402 a set of cell identifiers, each cell identifier of the set assigned to a corresponding interfering radio cell of the plurality of interfering radio cells. The method 400 includes detecting 403 a transmission from a first interfering radio cell of the plurality of interfering radio cells in the received signal based on a first cell identifier of the set of cell identifiers and based on a set of hypotheses, each hypothesis of the set indicating a respective combination of a scrambling identifier and a DMRS antenna port of the first interfering radio cell.

The method 400 may further include determining for each hypothesis of the set of hypotheses a channel of the first interfering radio cell based on the respective combination of the scrambling identifier and the DMRS antenna port of the first interfering radio cell.

The set of cell identifiers may be signaled by a network. The method may include providing the set of cell identifiers autonomously via cell search procedures.

The method 400 may correspond to the method 200 described above with respect to FIG. 2 when the reference symbol of the method 200 is a DMRS symbol (demodulation reference symbol).

The method 400 may be realized by an algorithm, hereinafter referred to as "Algorithm 1" and an optimization to that algorithm, hereinafter referred to as "Algorithm 2". Both algorithms are described in the following sections.

Algorithm 1: The technique DMRS-IC based channel estimation according to Algorithm 1 to estimate the channel of the interfering hypotheses involves successively estimating a channel at the DMRS REs for each hypothesis using a Wiener Filtering approach, reconstructing the DMRS signal and cancelling out the reconstructed DMRS signal from the received signal to further process the remaining hypotheses. Once the channel at the DMRS REs are estimated, the channel powers provide an idea regarding the presence of the interfering streams. Based on the accuracy of the channel estimates of the hypotheses, the interferer detection process is more reliable. To obtain a more accurate channel estimate for the hypotheses, the interferer parameter detection is iterated several times. However, every iteration step is computationally very expensive.

As an initial step, the assumption is that the Cell ID's of the potential interfering cells are perfectly known to the UE (e.g. obtained via higher-layer signaling). Since the Cell ID's of the potential interfering cells are known, this approach can be termed as Semi-blind detection of interferer parameters. The hypotheses per interfering cell are built based on the $n_{SCID}$ and the DMRS AP. When limiting the number of DMRS AP to 2, a total of 4 hypotheses can be built for each interfering cell namely:
  nSCID=0 DMRS AP=7,
  nSCID=0 DMRS AP=8,
  nSCID=1 DMRS AP=7,
  nSCID=1 DMRS AP=8.

For a scenario with two dominant interferers present, there are a total of 8 hypotheses to process. In other words, there are 8 signal streams whose channels at the DMRS REs have to be estimated for each iteration step of the interferer detection process. It must be noted that the processing is done for every PRB-pair in a subframe individually.

Algorithm 2 (Low complex approach): The idea behind the low-complex approach according to Algorithm 2 for accurate interferer parameter detection is that the majority of hypotheses might be inactive in a PRB-pair within a subframe. Thus, based on the channel powers at the end of the first iteration, one can eliminate the hypotheses with extremely low powers from the system. Thus, higher iterations will have a trimmed list of interfering hypotheses, resulting in a lower number of computations. Also, since most of the inactive hypotheses can be eliminated from the system, the system modelling is more accurate and hence, more accurate interferer parameter detection is achieved, leading to a better throughput performance.

The proposed solutions provide significant performance gains over the Baseline LMMSE-IRC receiver. The link-level performance analysis proves the feasibility of the described solutions. The main testing assumptions are summarized in Table 1 below:

TABLE 1 main testing assumptions

| Parameter | Value |
|---|---|
| Channel | EPA-5 Hz |
| System bandwidth | 10 MHz |
| Number of interference cells | 2 |
| Antenna configuration | 2 × 2, low correlation |
| Interference scenario | TBD |
| | TM9 |
| | RI = 1 |
| | 50 PRB pair PDSCH resource allocation |
| | MCS 5: QPSK, Rate 1/3 |
| | Maximum 4 HARQ retransmissions |
| Transmission parameters of interference signals | TM9 |
| | RI = 1 |
| | 50 PRB pair PDSCH resource allocation |
| | MCS 5: QPSK, Rate 1/3 |
| Receiver structure | Joint reduced complexity ML (R-ML) |
| | Processing of serving and interference cells |
| | Interferer modulation format is assumed to be known |

The interferer parameter detection consists in detecting which interfering streams are active. It is therefore termed stream detection. Once the interfering streams are detected, they are used to estimate the channel at the data REs. This is similar to the iterative approach explained for stream detection. However, the interfering list only contains the detected hypotheses from the stream detection process. The number of iterations used for Data RE CE is 3. There are 4 different interference environments considered for link level simulations.

The interferer parameters demodulation reference symbol scrambling identity and antenna port may be detected blindly whereas the Cell ID may be signaled by the network. The performance of the various algorithms is depicted in FIG. 5 and FIG. 6 as shown below.

Figure 5:
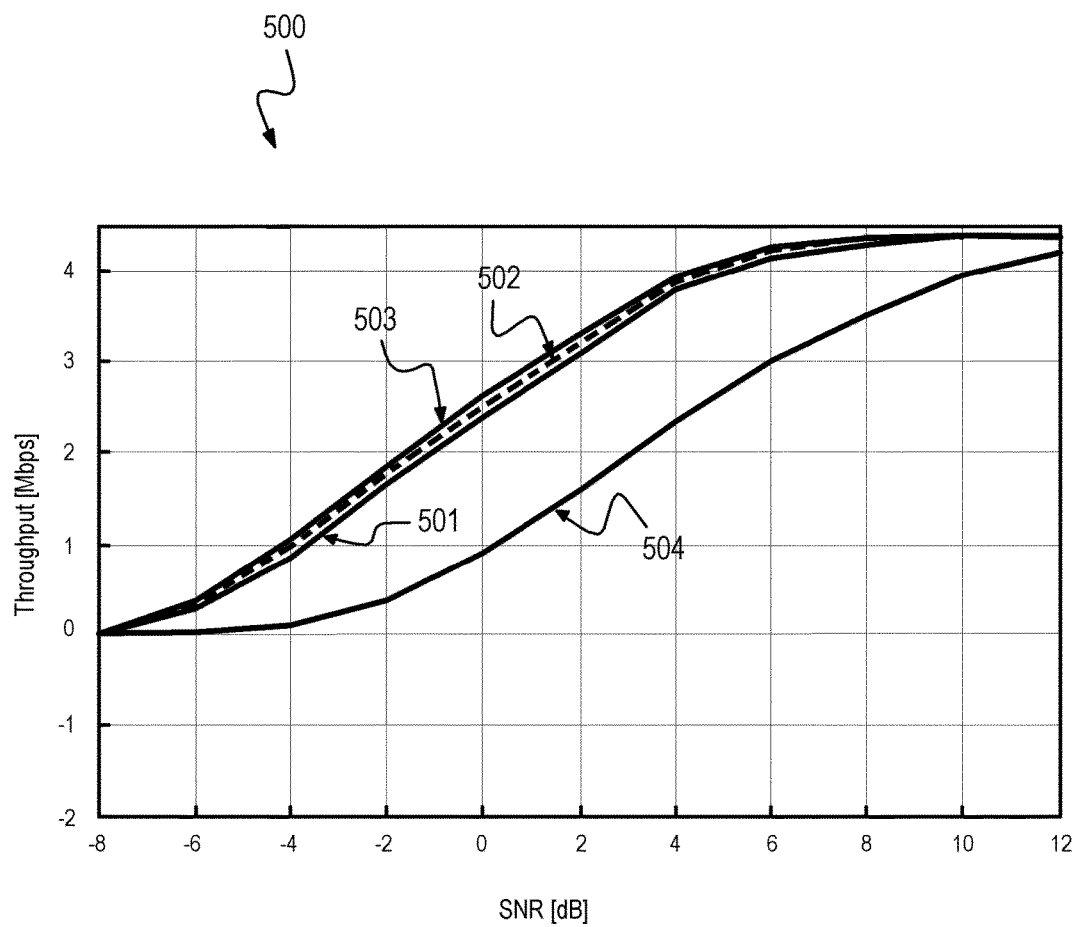
FIG. 5 illustrates a performance diagram 500 of a DMRS-IC based semi-blind parameter detection with two weak interferers.
Figure 6:
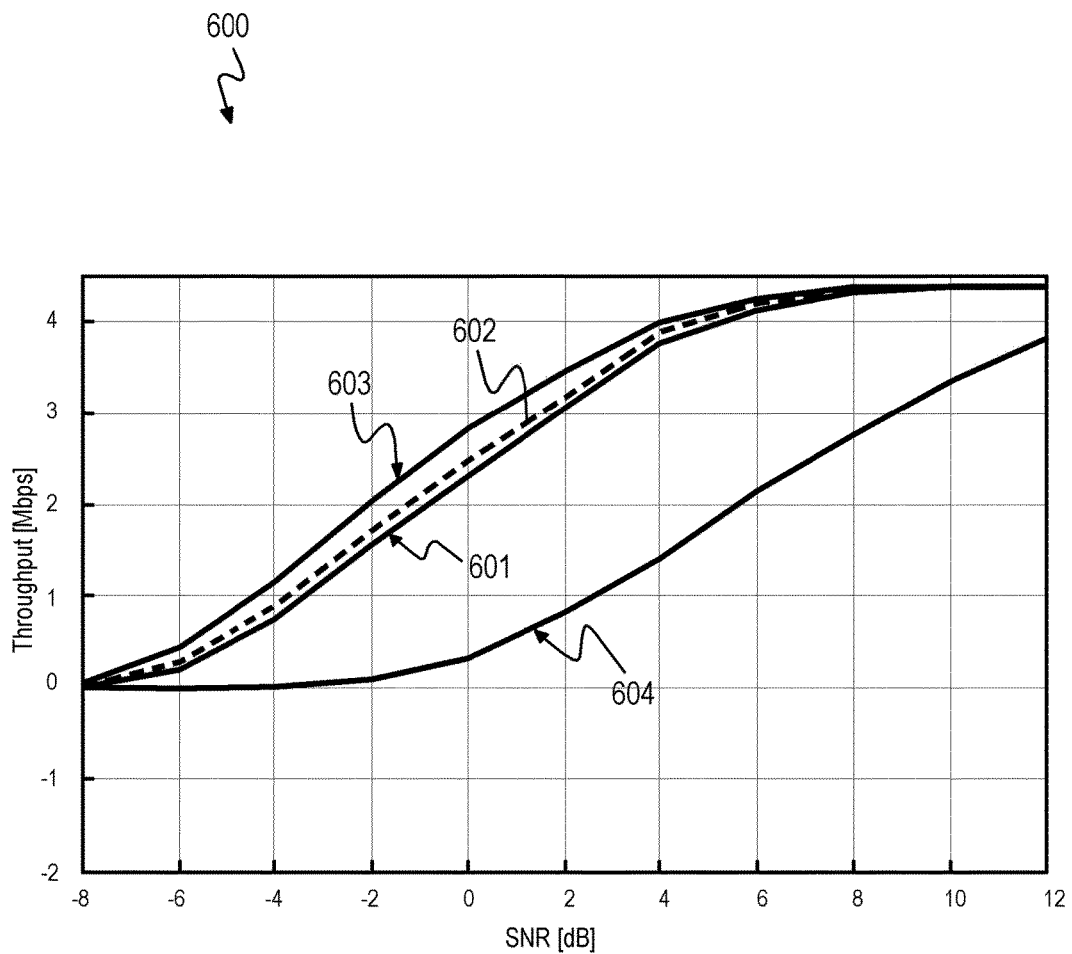
FIG. 6 illustrates a performance diagram 600 of a DMRS-IC based semi-blind parameter detection with two strong interferers.

FIG. 5 illustrates a performance diagram 500 of a DMRS-IC based semi-blind parameter detection with two weak interferers and FIG. 6 illustrates a performance diagram 600 of a DMRS-IC based semi-blind parameter detection with two strong interferers. The performance of the Baseline LMMSE-IRC algorithm, i.e. the interference rejection combining (IRC) algorithm using linear minimum mean square error (LMMSE) estimation is illustrated by the curves 504 and 604. The performance of Algorithm 1 according to the disclosure using 1 iteration for parameter detection is illustrated by the curves 501 and 601. The performance of Algorithm 1 according to the disclosure using 2 iterations for parameter detection is illustrated by the curves 502 and 602. The performance of Algorithm 1 according to the disclosure using 1 iteration for parameter detection is illustrated by the curves 501 and 601. The performance of Algorithm 2 according to the disclosure using 2 iterations with elimination of hypotheses for parameter detection is illustrated by the curves 503 and 603.

The results in FIGS. 5 and 6 demonstrate that estimating the channel for the interferers using DMRS-IC based semi-blind interferer parameter detection, along with joint R-ML detection leads to significant performance gains over the Baseline LMMSE-IRC. Increasing the iterations for interferer parameter detection does lead to abetter detection of interferer parameters and hence to a better throughput performance. If one eliminates the weak hypotheses at the end of the first iteration, the modeling is more accurate and the performance of interferer parameter detection improves leading to an overall improved system throughput. The gains of the various DMRS-IC based semi-blind interferer parameter detection techniques over the Baseline LMMSE-IRC approach for different interference scenarios are summarized below in Table 2:

TABLE 2 performance of DMRS-IC based semi-blind interferer parameter detection over baseline LMMSE-IRC

| | 1 iteration for parameter detection (Algorithm 1) | 2 iterations for parameter detection | 2 iterations for parameter detection with elimination of weak hypotheses (Algorithm 2) |
|---|---|---|---|
| INR1: 7.77 dB and INR2: 2.29 dB | Gain over Baseline LMMSE-IRC: 2.25 dB | Gain over Baseline LMMSE-IRC: 2.50 dB | Gain over Baseline LMMSE-IRC: 2.65 dB |
| INR1: 13.91 dB and INR2: 3.34 dB | Gain over Baseline LMMSE-IRC: 4.20 dB | Gain over Baseline LMMSE-IRC: 4.50 dB | Gain over Baseline LMMSE-IRC: 4.80 dB |
| INR1: 11.39 dB and INR2: 5.45 dB | Gain over Baseline LMMSE-IRC: 4.70 dB | Gain over Baseline LMMSE-IRC: 5.05 dB | Gain over Baseline LMMSE-IRC: 5.40 dB |
| INR1: 18.46 dB and INR2: 7.09 dB | Gain over Baseline LMMSE-IRC: 6.60 dB | Gain over Baseline LMMSE-IRC: 7.15 dB | Gain over Baseline LMMSE-IRC: 8.30 dB |

Figure 7:
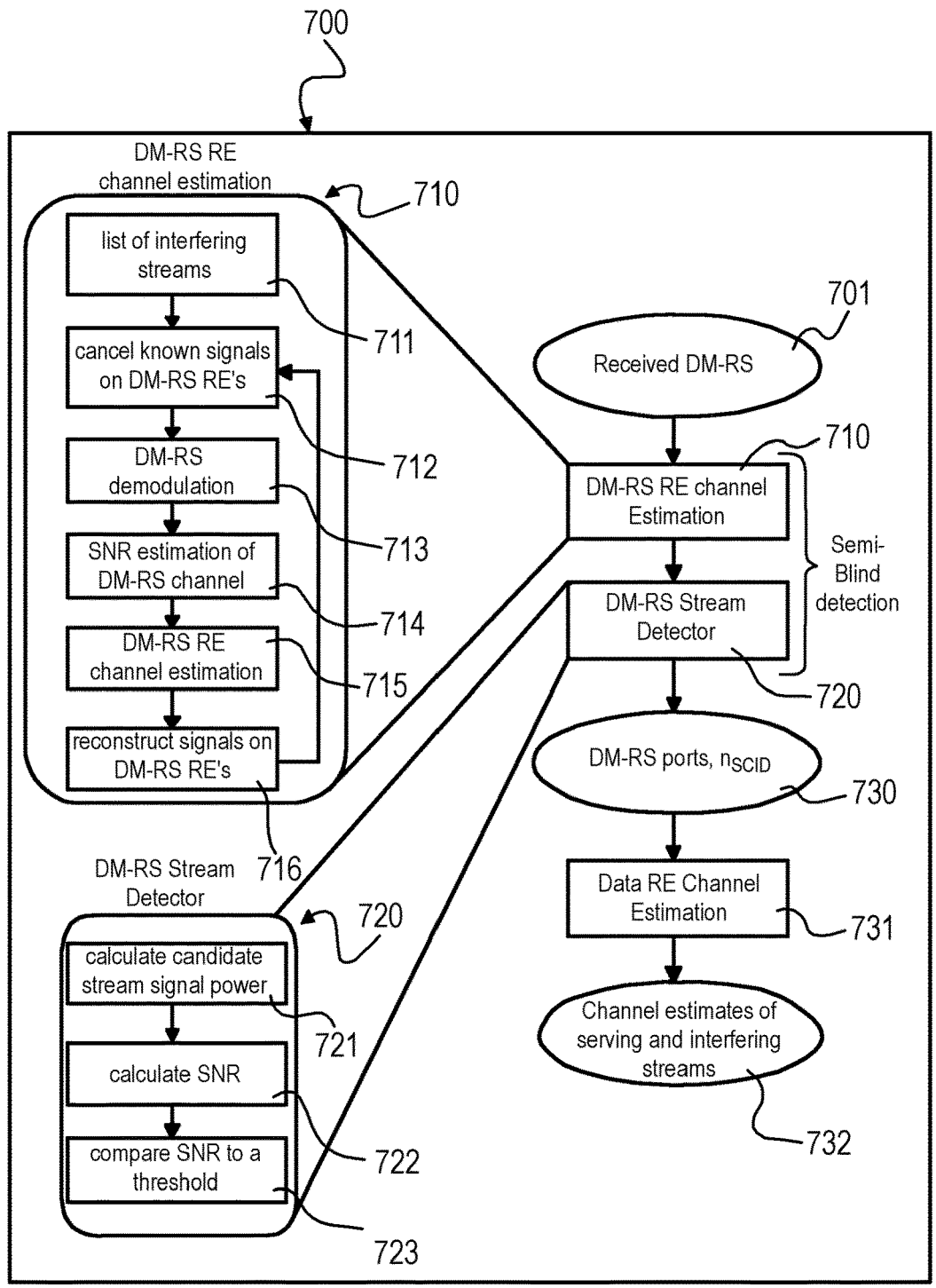
FIG. 7 illustrates a block diagram of an algorithm 700 for DMRS-IC based semi-blind parameter detection.

FIG. 7 illustrates a block diagram of an algorithm 700 for DMRS-IC based semi-blind interferer parameter detection.

The algorithm 700 processes the following operations: Receive DM-RS signal 701, DM-RS RE Channel Estimation 710, DM-RS Stream Detection 720, determining DM-RS ports and $n_{SCID}$ (scrambling ID) 730, Date RE channel estimation 731, providing channel estimates of serving and interfering streams 732. The operations DM-RS RE Channel Estimation 710, DM-RS Stream Detection that belong to the semi blind detection processing block include the following operations. DM-RS RE Channel Estimation 710 includes providing list of interfering streams 711, cancel known signals on DM-RS REs 712, DM-RS demodulation 713, SNR estimation of DM-RS channel 714, DM-RS RE channel estimation 715, reconstruct signals on DM-RS REs 716. DM-RS Stream Detection 720 includes calculate candidate stream signal power 721, calculate SNR 722, compare SNR to a threshold 723.

The algorithm 700 comprises the four main processing blocks (for Algorithm 1 and Algorithm 2):

1) Create list of DMRS signal hypothesis, 711
   a. $1^{st}$ iteration—All hypothesis are included in the set:
   i. Serving cell signal parameters (known)
   ii. All potential interference cell DMRS signal hypothesis.
   b. $2^{nd}$ iteration—Serving cell signal and reduced set of interference cell DMRS signal hypothesis.
   i. For the down-selection of hypothesis, the hypothesis SNR (or INR) can be compared to a pre-defined threshold to decide on the signal presence. The absent signals can be moved out of the list of hypothesis, 712. (Algorithm 2).
   c. 3rd or more iteration(s)—further down-selection of interference cell DMRS signal hypothesis can be done if needed 2) Channel estimation on DMRS REs for all DMRS signal hypothesis, 715.
   a. In one embodiment, DMRS-IC based channel estimation algorithm can be applied.
   b. As the result of the operation, the channel estimates of the corresponding DMRS signal hypothesis are obtained.
   c. The residual noise variance estimate can be obtained after cancelling the estimated receive signals corresponding to all hypotheses.

3) DMRS presence detection (DMRS Stream detector, 720)
   a. Calculate average interference DMRS signal hypothesis signal receive power, 721.
   b. Calculate interference DMRS signal hypothesis SNR, 722.
   c. Compare interference DMRS signal hypothesis SNR to pre-defined SNR Threshold, 723. In case the SNR exceeds the threshold, a decision on the signal presence can be made (i.e. in the last iteration).

4) Repeat processing blocks 1-3 to improve the detection reliability.

The reliability of the interferer parameter detection algorithm increases when one iterates the above mentioned blocks (Blocks 1-3) several times. Each iteration is computationally very expensive. Algorithm 2 allows to reduce the computational effort by eliminating some hypotheses for higher iterations. This optimization (Algorithm 2) can be illustrated with an example as shown in the FIG. 9. It is based on the test case setting as shown in Table 2. There is single active stream for each cell (serving and interfering). During the interferer parameter detection, the UE prepares a list of 8 interfering hypotheses. The knowledge of the serving cell DMRS is known.

Figure 8:
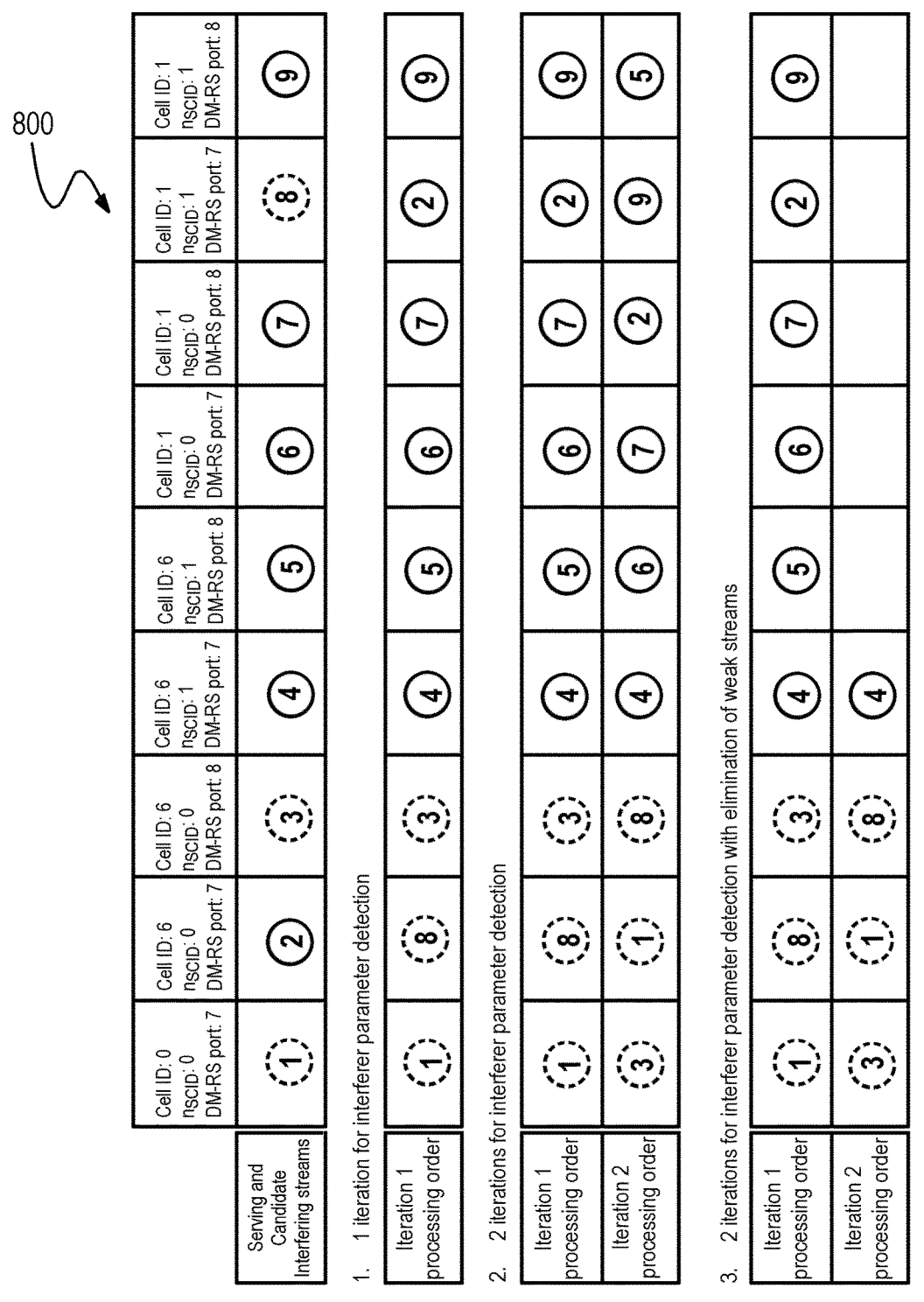

FIG. 8 illustrates a schematic diagram 800 illustrating the operation of the algorithm 700 depicted in FIG. 7.

The 2 active interfering streams are numbered 3 and 8 and shown in dotted lines. If the interferer parameter detection utilizes only a single iteration, the processing order can be created based on the CRS RSRP statistics. However, when the interferer parameter detection uses 2 iterations, the UE has knowledge of the channel powers and reorders the list appropriately (strongest candidate appears first) and performs the second iteration. This reordering provides small performance gains. It can be noted that the UE still retains all the hypotheses for processing, and this leads to an inaccurate system modeling and additional computations.

The optimization (Algorithm 2) as shown in Section 3 of FIG. 8 eliminates most of the inactive hypotheses after the first iteration using a certain INR threshold as the criteria. Two different thresholds can be used for the first and the second iteration of the interferer parameter detection (−3 dB and 0 dB were used as exemplary thresholds for first and second iteration respectively). The system modeling is more accurate when weak hypotheses are eliminated and since there are only a limited number of candidates remaining (3 interfering hypotheses) the higher numbered iterations are computationally less expensive.

A measure for the accuracy of the stream detection algorithm is given in terms of the number of misdetections (MD) of the active interfering streams. The MD rate is defined as the average across all SNR values of the ratio of the total number of active interfering streams detected as inactive by the algorithm 700 (Algorithm 1, Algorithm 2) to the total number of active interfering streams.

A similar definition can be given for the false alarms (inactive interfering streams detected as active). It was observed that the false alarm (FA) rates were extremely low (less than 0.005) and did not lead to significant degradation of the receiver performance. However, the MD rates were relatively high and lead to performance degradation. The misdetected interfering streams will be treated as noise by the receiver and will be present as a part of the interference plus noise covariance matrix. If the MD rate is 1, then the performance of the DMRS-IC based semi-blind channel estimation falls to the Baseline LMMSE-IRC approach. Table 3 below summarizes the misdetection rate (MD rate) for various interference environments.

TABLE 3 misdetection rate of DMRS-IC based semi-blind interferer parameter detection for various interference scenarios

| | 1 iteration for parameter detection (Algorithm 1) | 2 iterations for parameter detection | 2 iterations for parameter detection with elimination of weak hypotheses (Algorithm 2) |
|---|---|---|---|
| INR1: 7.77 dB and INR2: 2.29 dB | MD Rate: 0.3425 | MD Rate: 0.1808 | MD Rate: 0.1397 |
| INR1: 13.91 dB and INR2: 3.34 dB | MD Rate: 0.3333 | MD Rate: 0.1508 | MD Rate: 0.0962 |
| INR1: 11.39 dB and INR2: 5.45 dB | MD Rate: 0.2297 | MD Rate: 0.0795 | MD Rate: 0.0577 |
| INR1: 18.46 dB and INR2: 7.09 dB | MD Rate: 0.2253 | MD Rate: 0.0758 | MD Rate: 0.0463 |

The methods and devices according to the disclosure provide a technique for accurate detection of interferer parameters at the UE and may be used for channel estimation between the interfering cell and the UE. For the case of using LTE DMRS transmission modes (e.g. TM8, TM9 and TM10) in the interfering cell, the interferer parameters that may be detected are for example the Cell ID (PCID/VCID), $n_{SCID}$ and the DMRS AP (antenna port) used for transmission. The methods and devices according to the disclosure may include a detection process involving preparing a list of all possible hypotheses and estimating their channel at the DMRS REs. Based on the estimated received signal powers, the active interfering cell parameters may be detected. The methods and devices according to the disclosure provide a new approach which provides a very accurate interferer parameter detection with comparably low computational complexity.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods 200, 400 or the algorithm 700 as described above with respect to FIGS. 2, 4 and 7. Such a computer program product may include a readable storage medium storing program code thereon for use by a processor, the program code comprising instructions for performing any of the methods 200, 400 or the algorithm 700 as described above.

EXAMPLES

The following examples pertain to further embodiments. Example 1 is a method for detecting a transmission from an interfering radio cell, the method comprising: receiving a signal comprising transmissions from a serving radio cell and from a plurality of interfering radio cells, wherein a reference symbol of a transmission from at least one interfering radio cell of the plurality of interfering radio cells is colliding with a reference symbol of a transmission from the serving radio cell; generating a set of transmission signal hypotheses, each of which is dependent on at least one interferer parameter of the at least one interfering radio cell; obtaining at least one interferer radio cell identifier; and detecting a transmission from at least one interfering radio cell of the plurality of interfering radio cells in the received signal based on the at least one interferer radio cell identifier and the set of transmission signal hypotheses.

In Example 2, the subject matter of Example 1 can optionally include obtaining the at least one interferer radio cell identifier by using higher layer signaling.

In Example 3, the subject matter of Example 1 can optionally include obtaining the at least one interferer radio cell identifier autonomously via cell search procedures.

In Example 4, the subject matter of any one of Examples 1-3 can optionally include that the received signal comprises an interference signal reference symbol of the at least one interfering radio cell which is colliding with a serving signal reference symbol of the serving cell.

In Example 5, the subject matter of any one of Examples 1-4 can optionally include determining a channel estimate of the at least one interfering radio cell based on the set of hypotheses.

In Example 6, the subject matter of Example 5 can optionally include determining the channel estimate of the at least one interfering radio cell based on the set of hypotheses dependent on all interferer parameters of the at least one interfering radio cell.

In Example 7, the subject matter of any one of Examples 5-6 can optionally include determining the channel estimate of the at least one interfering radio cell for each hypothesis of the set of hypotheses based on a respective combination of the interferer parameters of the at least one interfering radio cell.

In Example 8, the subject matter of any one of Examples 1-7 can optionally include that the at least one interferer parameter comprises an interference signal scrambling identity and that a second interferer parameter comprises an interference signal antenna port used for transmission.

In Example 9, the subject matter of Example 1 can optionally include determining a channel estimate of the serving radio cell; reconstructing the received reference signal from the channel estimate of the serving radio cell; and cancelling the reconstructed transmission from the received signal.

In Example 10, the subject matter of any one of Examples 1-9 can optionally include reconstructing the received signal from the at least one interfering radio cell based on the channel of the at least one interfering radio cell determined based on the set of hypotheses; and cancelling the reconstructed received signal from the at least one interfering radio cell from the total received signal.

In Example 11, the subject matter of Example 10 can optionally include that the reconstructed received signal from the at least one interfering radio cell is cancelled from the received signal if the estimate of the first interfering radio cell signal receive power determined based on the set of hypotheses crosses a threshold.

In Example 12, the subject matter of any one of Examples 1-11 can optionally include that detecting a transmission from the at least one interfering radio cell in the received signal is iteratively repeated until a transmission is successfully detected.

In Example 13, the subject matter of Example 12 can optionally include that the transmission from the at least one interfering radio cell is successfully detected if a reconstructed receive signal power from the at least one interfering radio cell is above a predetermined power value.

In Example 14, the subject matter of any one of Examples 1-13 can optionally include: creating a list of interference signal hypotheses; performing channel estimation on interference signal REs for all interference signal hypotheses; and performing interference signal presence detection.

In Example 15, the subject matter of any one of Examples 1-14 can optionally include: reconstructing the received signal from the at least one interfering radio cell based on a channel estimate of the at least one interfering radio cell determined based on the set of hypotheses; and cancelling the reconstructed received signal from the at least one interfering radio cell from the total received signal.

In Example 16, the subject matter of Example 15 can optionally include cancelling the reconstructed received signal from the at least one interfering radio cell from the received signal if the channel estimate is above a predetermined power value.

Example 17 is a device for detecting a transmission from an interfering radio cell, the device comprising: a first receiving circuit configured to receive a signal comprising transmissions from a serving radio cell and from a plurality of interfering radio cells, wherein a demodulation reference symbol of a transmission from at least one interfering radio cell of the plurality of interfering radio cells is colliding with a demodulation reference symbol of a transmission from the serving radio cell; a second receiving circuit configured to receive a set of cell identifiers, each cell identifier of the set assigned to a corresponding interfering radio cell of the plurality of interfering radio cells; and a detection circuit configured to detect a transmission from a first interfering radio cell of the plurality of interfering radio cells in the received signal based on a first cell identifier of the set of cell identifiers and based on a set of hypotheses, each hypothesis of the set indicating a respective combination of a scrambling identifier and a demodulation reference symbol antenna port of the first interfering radio cell.

In Example 18, the subject matter of Example 17 can optionally include a processing circuit configured to determine for each hypothesis of the set of hypotheses a channel of the first interfering radio cell based on the respective combination of the scrambling identifier and the demodulation reference symbol antenna port of the first interfering radio cell.

In Example 19, the subject matter of Example 18 can optionally include that the processing circuit is configured to detect for each hypothesis of the set of hypotheses the transmission from the first interfering radio cell based on the estimate of the first interfering radio cell signal receive power determined based on the respective hypothesis.

In Example 20, the subject matter of Example 19 can optionally include that the processing circuit is configured to eliminate the hypotheses for which the estimate of the first interfering radio cell signal receive power determined based on the respective hypothesis is below a threshold.

In Example 21, the subject matter of any one of Examples 19-20 can optionally include that the processing circuit is configured to reconstruct the received signal from the first interfering radio cell based on the estimate of the first interfering radio cell signal receive power determined based on the respective hypothesis; and that the processing circuit is configured to cancel the reconstructed received signal from the first interfering radio cell from the total received signal.

In Example 22, the subject matter of Example 21 can optionally include that the detection circuit is configured to detect a transmission from a second interfering radio cell of the plurality of interfering radio cells in the received signal based on a second cell identifier of the set of cell identifiers and based on a set of hypotheses, each hypothesis of the set indicating a respective combination of a scrambling identifier and a demodulation reference symbol antenna port of the second interfering radio cell; and that the processing circuit is configured to cancel the reconstructed received signal from the second interfering radio cell from the received signal obtained after cancellation of the reconstructed received signal from the first interfering radio cell.

Example 23 is a method for detecting a transmission from an interfering radio cell, the method comprising: receiving a signal comprising transmissions from a serving radio cell and from a plurality of interfering radio cells, wherein a demodulation reference symbol (DMRS) of a transmission from at least one interfering radio cell of the plurality of interfering radio cells is colliding with a DMRS of a transmission from the serving radio cell; receiving a set of cell identifiers, each cell identifier of the set assigned to a corresponding interfering radio cell of the plurality of interfering radio cells; detecting a transmission from a first interfering radio cell of the plurality of interfering radio cells in the received signal based on a first cell identifier of the set of cell identifiers and based on a set of hypotheses, each hypothesis of the set indicating a respective combination of a scrambling identifier and a DMRS antenna port of the first interfering radio cell.

In Example 24, the subject matter of Example 23 can optionally include determining for each hypothesis of the set of hypotheses a channel of the first interfering radio cell based on the respective combination of the scrambling identifier and the DMRS antenna port of the first interfering radio cell.

In Example 25, the subject matter of any one of Examples 23-24 can optionally include that the set of cell identifiers is signaled by a network.

Example 26 is a computer readable medium on which computer instructions are stored which when executed by a computer, cause the computer to perform the method of one of Examples 1 to 16 and 23 to 25.

Example 27 is a device for detecting a transmission from an interfering radio cell, the device comprising: means configured to receive a signal comprising transmissions from a serving radio cell and from a plurality of interfering radio cells, wherein a reference symbol of a transmission from at least one interfering radio cell of the plurality of interfering radio cells is colliding with a reference symbol of a transmission from the serving radio ell; means configured to receive a first cell identifier identifying a first interfering radio cell of the plurality of interfering radio cells; and means configured to detect a transmission from the first interfering radio cell in the received signal based on the first cell identifier and based on a hypothesis indicating at least one interference parameter of the first interfering radio cell.

In Example 28, the subject matter of Example 27 can optionally include that the received signal comprises a demodulation reference symbol of the at least one interfering radio cell which is colliding with a demodulation reference symbol of the serving cell.

In Example 29, the subject matter of any one of Examples 27-28 can optionally include means configured to determine a channel of the first interfering radio cell based on a first hypothesis indicating a first combination of a first interference parameter and a second interference parameter of the first interfering radio cell.

In Example 30, the subject matter of Example 28 can optionally include that the first interference parameter comprises a scrambling identifier and that the second interference parameter comprises an antenna port used for transmission.

In Example 31, the subject matter of any one of Examples 29-30 can optionally include means configured to detect the transmission from the first interfering radio cell based on a power of the channel of the first interfering radio cell determined based on the first hypothesis.

In Example 32, the subject matter of Example 31 can optionally include means for reconstructing the received signal from the first interfering radio cell based on the channel of the first interfering radio cell determined based on the first hypothesis; and means for cancelling the reconstructed transmission from the first interfering radio cell from the received signal.

In Example 33, the subject matter of Example 32 can optionally include that the reconstructed transmission from the first interfering radio cell is only cancelled from the received signal if the power of the channel of the first interfering radio cell determined based on the first hypothesis crosses a threshold.

In Example 34, the subject matter of any one of Examples 29-33 can optionally include means configured to determine a channel of the first interfering radio cell based on a second hypothesis indicating a second combination of the first interference parameter and the second interference parameter of the first interfering radio cell.

In Example 35, the subject matter of Example 34 can optionally include means configured to detect the transmission from the first interfering radio cell based on a power of the channel of the first interfering radio cell determined based on the second hypothesis.

In Example 36, the subject matter of Example 35 can optionally include means for reconstructing the received signal from the first interfering radio cell based on the channel of the first interfering radio cell determined based on the second hypothesis; and means for cancelling the reconstructed transmission from the first interfering radio cell from the received signal.

In Example 37, the subject matter of Example 36 can optionally include that the reconstructed received signal from the first interfering radio cell is only cancelled from the received signal if the power of the channel of the first interfering radio cell determined based on the second hypothesis crosses a threshold.

In Example 38, the subject matter of any one of Examples 27-37 can optionally include means configured to receive a second cell identifier identifying a second interfering radio cell of the plurality of interfering radio cells; and means configured to detect a transmission from the second interfering radio cell in the received signal based on the second cell identifier and based on a hypothesis indicating at least one interference parameter of the second interfering radio cell.

In Example 39, the subject matter of Example 38 can optionally include means configured to determine a channel of the second interfering radio cell of the plurality of interfering radio cells based on a third hypothesis indicating a combination of a first interference parameter and a second interference parameter of the second interfering radio cell.

In Example 40, the subject matter of Example 39 can optionally include means configured to detect the transmission from the second interfering radio cell based on a power of the channel of the second interfering radio cell determined based on the third hypothesis.

In Example 41, the subject matter of Example 40 can optionally include means for reconstructing the received signal from the second interfering radio cell based on the channel of the second interfering radio cell determined based on the third hypothesis if the power of the channel of the second interfering radio cell determined based on the third hypothesis crosses a threshold; and means for cancelling the reconstructed transmission from the second interfering radio cell from the received signal.

In Example 42, the subject matter of Example 41 can optionally include that the reconstructed transmission from the second interfering radio cell is only cancelled from the received signal if the power of the channel of the second interfering radio cell determined based on the third hypothesis crosses a threshold.

Example 43 is a device for detecting a transmission from an interfering radio cell, the device comprising: means configured to receive a signal comprising transmissions from a serving radio cell and from a plurality of interfering radio cells, wherein a DMRS symbol of a transmission from at least one interfering radio cell of the plurality of interfering radio cells is colliding with a DMRS symbol of a transmission from the serving radio cell; means configured to receive a set of cell identifiers, each cell identifier of the set assigned to a corresponding interfering radio cell of the plurality of interfering radio cells; means configured to detect a transmission from a first interfering radio cell of the plurality of interfering radio cells in the received signal based on a first cell identifier of the set of cell identifiers and based on a set of hypotheses, each hypothesis of the set indicating a respective combination of a scrambling identifier and a DMRS antenna port of the first interfering radio cell.

In Example 44, the subject matter of Example 43 can optionally include means configured to determine for each hypothesis of the set of hypotheses a channel of the first interfering radio cell based on the respective combination of the scrambling identifier and the DMRS antenna port of the first interfering radio cell.

In Example 45, the subject matter of any one of Examples 43-44 can optionally include that the set of cell identifiers is signaled by a network.

Example 46 is a system configured to detect a transmission from an interfering radio cell, the system comprising: a first receiving device for receiving a signal comprising transmissions from a serving radio cell and from a plurality of interfering radio cells, wherein a demodulation reference symbol of a transmission from at least one interfering radio cell of the plurality of interfering radio cells is colliding with a demodulation reference symbol of a transmission from the serving radio cell; a second receiving device configured to receive a set of cell identifiers, each cell identifier of the set assigned to a corresponding interfering radio cell of the plurality of interfering radio cells; and a detection device configured to detect a transmission from a first interfering radio cell of the plurality of interfering radio cells in the received signal based on a first cell identifier of the set of cell identifiers and based on a set of hypotheses, each hypothesis of the set indicating a respective combination of a scrambling identifier and a demodulation reference symbol antenna port of the first interfering radio cell.

In Example 47, the subject matter of Example 46 can optionally include a processing device configured to determine for each hypothesis of the set of hypotheses a channel of the first interfering radio cell based on the respective combination of the scrambling identifier and the demodulation reference symbol antenna port of the first interfering radio cell.

In Example 48, the subject matter of any one of Examples 46-47 can optionally include that the system is an on-chip system.

In Example 49, the subject matter of any one of Examples 23-25 can optionally include obtaining a respective combination of a scrambling identifier and a DMRS antenna port of the first interfering radio cell; and generating the set of hypotheses, each of which is dependent on the respective combination of the scrambling identifier and the DMRS antenna port of the first interfering radio cell.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method for detecting a transmission from an interfering radio cell, the method comprising:
receiving a signal comprising transmissions from a serving radio cell and from a plurality of interfering radio cells, wherein a reference symbol of a transmission from at least one interfering radio cell of the plurality of interfering radio cells is colliding with a reference symbol of a transmission from the serving radio cell;
generating a set of transmission signal hypotheses, each of which is dependent on at least one interferer parameter of the at least one interfering radio cell;
obtaining at least one interferer radio cell identifier; and
detecting a transmission from at least one interfering radio cell of the plurality of interfering radio cells in the received signal based on the at least one interferer radio cell identifier and the set of transmission signal hypotheses.

2. The method of claim 1, comprising:
obtaining the at least one interferer radio cell identifier by using higher layer signaling.

3. The method of claim 1, comprising:
obtaining the at least one interferer radio cell identifier autonomously via cell search procedures.

4. The method of claim 1,
wherein the received signal comprises an interference signal reference symbol of the at least one interfering radio cell which is colliding with a serving signal reference symbol of the serving cell.

5. The method of claim 1, comprising:
determining a channel estimate of the at least one interfering radio cell based on the set of hypotheses.

6. The method of claim 5, comprising:
determining the channel estimate of the at least one interfering radio cell based on the set of hypotheses dependent on all interferer parameters of the at least one interfering radio cell.

7. The method of claim 5, comprising:
determining the channel estimate of the at least one interfering radio cell for each hypothesis of the set of hypotheses based on a respective combination of the interferer parameters of the first interfering radio cell the at least one interfering radio cell.

8. The method of claim 1,
wherein at least one interferer parameter comprises an interference signal scrambling identity and wherein a second interferer parameter comprises an interference signal antenna port used for transmission.

9. The method of claim 1, comprising:
determining a channel estimate of the serving radio cell;
reconstructing a received reference signal from the channel estimate of the serving radio cell; and
cancelling the reconstructed received reference signal from the received signal.

10. The method of claim 1, comprising:
reconstructing a received interference signal from the at least one interfering radio cell based on a channel estimate of the at least one interfering radio cell determined based on the set of hypotheses; and
cancelling the reconstructed received interference signal from the at least one interfering radio cell from the received signal.

11. The method of claim 10,
wherein the reconstructed received interference signal from the at least one interfering radio cell is cancelled from the received signal when an estimated receive power of the reconstructed received interference signal determined based on the set of hypotheses crosses a threshold.

12. The method of claim 1,
wherein the transmission from the at least one interfering radio cell is successfully detected if a reconstructed receive signal power from the at least one interfering radio cell is above a predetermined power value.

13. The method of claim 1, comprising:
creating a list of interference signal hypotheses;
performing a channel estimation on interference signal resource elements (REs) for each of the listed interference signal hypotheses; and
performing interference signal presence detection.

14. The method of claim 10, comprising:
cancelling the reconstructed received interference signal from the at least one interfering radio cell from the received signal if a channel power estimate of the at least one interfering radio cell is above a predetermined power value.

15. A device for detecting a transmission from an interfering radio cell, the device comprising:
a first receiving circuit configured to receive a signal comprising transmissions from a serving radio cell and from a plurality of interfering radio cells, wherein a demodulation reference symbol of a transmission from at least one interfering radio cell of the plurality of interfering radio cells is colliding with a demodulation reference symbol of a transmission from the serving radio cell;
a second receiving circuit configured to receive a set of cell identifiers, each cell identifier of the set assigned to a corresponding interfering radio cell of the plurality of interfering radio cells; and
a detection circuit configured to detect a transmission from a first interfering radio cell of the plurality of interfering radio cells in the received signal based on a first cell identifier of the set of cell identifiers and based on a set of hypotheses, each hypothesis of the set indicating a respective combination of a scrambling identifier and a demodulation reference symbol antenna port of the first interfering radio cell.

16. The device of claim 15, comprising:
a processing circuit configured to determine for each hypothesis of the set of hypotheses a respective channel of the first interfering radio cell based on the respective combination of the scrambling identifier and the demodulation reference symbol antenna port of the first interfering radio cell.

17. The device of claim 16,
wherein the processing circuit is configured to detect for each hypothesis of the set of hypotheses a presence of the transmission from the first interfering radio cell based on an estimate of a receive power of the respective channel of the first interfering radio cell signal determined based on the respective hypothesis.

18. The device of claim 17,
wherein the processing circuit is configured to eliminate the hypotheses for which the estimated receive power of the first interfering radio cell signal determined based on the respective hypothesis is below a threshold.

19. The device of claim 17,
wherein the processing circuit is configured to reconstruct a received interference signal from the first interfering radio cell based on the estimated receive power of the first interfering radio cell signal determined based on the respective hypothesis; and
wherein the processing circuit is configured to cancel the reconstructed received interference signal from the first interfering radio cell from the received signal.

20. The device of claim 19,
wherein the detection circuit is configured to detect a transmission from a second interfering radio cell of the plurality of interfering radio cells in the received signal based on a second cell identifier of the set of cell identifiers and based on a set of hypotheses, each hypothesis of the set indicating a respective combination of a scrambling identifier and a demodulation reference symbol antenna port of the second interfering radio cell; and
wherein the processing circuit is configured to cancel a reconstructed received interference signal from the second interfering radio cell from the received signal obtained after cancellation of the reconstructed received interference signal from the first interfering radio cell.

21. A method for detecting a transmission from an interfering radio cell, the method comprising:
receiving a signal comprising transmissions from a serving radio cell and from a plurality of interfering radio cells, wherein a demodulation reference symbol (DMRS) of a transmission from at least one interfering radio cell of the plurality of interfering radio cells is colliding with a DMRS of a transmission from the serving radio cell;
receiving a set of cell identifiers, each cell identifier of the set assigned to a corresponding interfering radio cell of the plurality of interfering radio cells; and
detecting a transmission from a first interfering radio cell of the plurality of interfering radio cells in the received signal based on a first cell identifier of the set of cell identifiers and based on a set of hypotheses, each hypothesis of the set indicating a respective combination of a scrambling identifier and a DMRS antenna port of the first interfering radio cell.

22. The method of claim 21, comprising:
determining for each hypothesis of the set of hypotheses a channel of the first interfering radio cell based on the respective combination of the scrambling identifier and the DMRS antenna port of the first interfering radio cell.

23. The method of claim 21,
wherein the set of cell identifiers is signaled by a network.

24. The method of claim 21, further comprising:
determining a scrambling identifier and a DMRS antenna port of the detected transmission from the first interfering radio cell based on the hypothesis corresponding to the detected transmission, wherein an estimated receive power of the detected transmission from the first interfering radio cell is above a predetermined power value.

25. The method of claim 1, further comprising:
determining a residual noise variance estimate based on the set of hypotheses;
eliminating one or more respective hypothesis from the set of hypotheses, wherein the one or more respective hypothesis corresponds to a reconstructed received interference signal for which the estimated receive power of the reconstructed received interference signal is below a threshold; and
updating the residual noise variance estimate based on the reduced set of hypotheses.

26. The method of claim 1, further comprising:
eliminating at least one transmission signal hypothesis from the set of transmission signal hypotheses to generate a reduced set of transmission signal hypotheses for a second iteration, wherein an estimated channel power of the at least one eliminated transmission signal hypothesis is below a first threshold; and
detecting the transmission from the at least one interfering radio cell of the plurality of interfering radio cells in the received signal based on the at least one interferer radio cell identifier and the reduced set of transmission signal hypotheses.

* * * * *